UNITED STATES PATENT OFFICE.

WALTHER FELD, OF LINZ-ON-THE-RHINE, GERMANY; KARL EMIL MARKEL, OF SOUTH KENSINGTON, ENGLAND, TEMPORARY ADMINISTRATOR OF SAID FELD, DECEASED.

PRODUCTION OF SULFUR AND SULFATES FROM POLYTHIONATE SOLUTIONS.

1,127,219.  Specification of Letters Patent.  Patented Feb. 2, 1915.

No Drawing.  Application filed July 11, 1912. Serial No. 708,907.

*To all whom it may concern:*

Be it known that I, WALTHER FELD, a subject of the King of Prussia and German Emperor, of Linz-on-the-Rhine, in the German Empire, have invented new and useful Improvements in the Production of Sulfur and Sulfates from Polythionate Solutions, of which the following is a specification.

Ammonia alone, or together with sulfureted hydrogen, in gases, vapors, or liquids, will be absorbed by reaction with polythionates of alkalis, of ammonium, or of earth-alkalis, as described in the specification of my U. S. Letters Patent No. 1,011,043. This process is based on the fact that the polythionates are reduced by sulfureted hydrogen and ammonium sulfid, forming thiosulfate while sulfur separates. By treating the thiosulfate with sulfurous acid it is again oxidized into polythionate. In this process I have observed that, under certain conditions, as hereinafter explained, the efficiency of the process diminished and it is the object of this invention to remove this objection by providing means to maintain the absorption power of the polythionate and the highest degree of efficiency by retarding the formation of sulfates and, after the liquor has been concentrated to the required strength, accelerating the formation of sulfates from the polythionates. For the purpose of the following description of the present invention I will presume that ammonium polythionate is used, but it is to be understood that polythionates of alkalis, or of earth alkalis, may be used instead, the reactions being the same, but then in treating gases containing ammonia and sulfureted hydrogen, sulfates of the alkalis, or earth alkalis, will also be formed and, if these be insoluble, they are separated from the ammonium sulfate by filtration while, if they be soluble, they are separated by fractional crystallization. When ammonia alone, or together with sulfureted hydrogen, is absorbed by means of the polythionates, the amount of ammonium salts in the washing liquor increases gradually so that finally the liquor can be treated to produce ammonium sulfate. For this purpose the liquor is treated with sulfurous acid and heat is applied at the same time, or subsequently. In this operation polythionate is formed from the thiosulfate and the polythionate, on boiling, or heating, is converted into ammonium sulfate, sulfur and sulfurous acid being separated.

The process comprises two operations, namely the washing operation and the formation of sulfate. The washing operation, in which the reducing agents, ammonia, ammonium sulfid and sulfureted hydrogen (which I will hereinafter refer to as reducing agents) are absorbed with the simultaneous separation of sulfur, also comprises two stages. In the first stage the reducing agents are absorbed by means of polythionates, thiosulfate being formed therefrom, while in the second stage polythionate is formed again from the thiosulfate by treating this with sulfurous acid. In the formation of sulfate, the thionates (under which term I will hereinafter refer to thiosulfates and polythionates) obtained in the washing operation are converted into sulfate, sulfur being thereby separated. The washing operation and the formation of sulfate is illustrated by the following example with reference to ammonium tetra-thionate, but the reductions are similar with salts of other polythionic acids.

Ammonia alone (that is, in the absence of sulfureted hydrogen) acts on ammonium tetra-thionate in such a manner that, from each molecular proportion of polythionate, one molecular proportion of ammonium thiosulfate and one of sulfate, together with free sulfur are produced.

(1). 
$$(NH_4)_2S_4O_6 + 2NH_3 + H_2O = (NH_4)_2SO_4 + (NH_4)_2S_2O_3 + S.$$

The amount of thionate in the liquor is not altered by the washing operation. Instead of one molecular proportion of polythionate, the liquor contains, after the washing operation, one molecular proportion of thiosulfate.

Ammonia together with sulfureted hydrogen acting on one molecular proportion of polythionate forms two molecular proportions of thiosulfate, sulfur being separated.

(2). 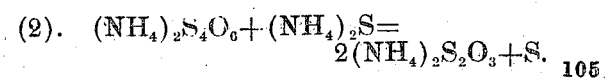
$$(NH_4)_2S_4O_6 + (NH_4)_2S = 2(NH_4)_2S_2O_3 + S.$$

which means that the amount of thionate has been doubled by the reduction process.

Sulfureted hydrogen alone, without the presence of ammonia, by acting on one molecular proportion of polythionate, forms one molecular proportion of thiosulfate.

(3). 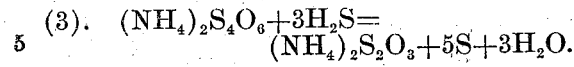
$(NH_4)_2S_4O_6 + 3H_2S = (NH_4)_2S_2O_3 + 5S + 3H_2O.$

The thiosulfate produced in any of these reactions is oxidized into polythionate by treatment with sulfurous acid.

(4.) 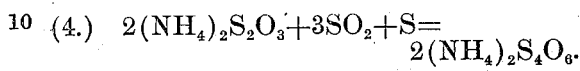
$2(NH_4)_2S_2O_3 + 3SO_2 + S = 2(NH_4)_2S_4O_6.$

The aforesaid reactions are not however under all conditions quantitative and are not completely distinct from one another. They are the final expression for a series of reactions. For example, in the washing process, some sulfate is produced, as some of the polythionate formed in the washing operation is decomposed into thiosulfate and sulfate, partly by heat, or by prolonged action, or by too high a concentration. Even under the influence of sulfurous acid sulfate may be formed. If, for instance, gases which, in addition to ammonia, contain an equivalent, or a surplus, of sulfureted hydrogen, be treated at temperatures above 60° centigrade with polythionate solutions, the aforesaid reaction (1) is preponderant (formation of sulfate together with thiosulfate), while the aforesaid reaction (2) (splitting a molecular proportion of polythionate into two molecular proportions of thiosulfate) is retarded. The said reaction (2) can be retarded to such an extent that instead of one molecular proportion of sulfureted hydrogen being absorbed on two molecular proportions of ammonia (corresponding to 100 per cent.), only 20 per cent., or less, of sulfureted hydrogen relatively to the ammonia are absorbed. By secondary reactions even more sulfate may be formed than corresponds to the aforesaid reaction (1). This premature formation of sulfate however is undesirable for the washing operation. The efficacy of the liquor as a washing agent and the complete extraction of the reduction agents from the gas depend on the amount of thionates (polythionate and thiosulfate) in the washing liquor. As long as the liquor is to be used for the washing operation it is necessary that the formation of sulfate should be retarded as much as possible, but for the second operation of the process it is desirable to accelerate the production of sulfate. In carrying out the process it is therefore important that in the first part of the process, in the washing operation, the decomposition of the thionates into sulfate should be retarded, while in the second part of the process the decomposition of thionates into sulfate should be accelerated.

For the purpose of retarding the decomposition of the thionates in the washing process, various means may be adopted, their application to the washing operation having all the same object, namely to prevent possible formation of sulfate and to thus keep the liquor as active as possible for the washing operation. The first and most important means for retarding the decomposition of polythionate consists in so maintaining the ratio between polythionate and thiosulfate in the washing liquor that there is always an excess of thiosulfate relatively to the polythionate. The necessity of this was not apparent as it would rather have been presumed that the polythionate alone would be decisive for the washing operation. In order to maintain an excess of thiosulfate in the washing liquor, the supply of sulfurous acid in the second phase of the washing process is regulated. For this purpose such a limited amount of sulfurous acid is supplied for the regeneration of the polythionate (reaction 4) that only part of the thiosulfate is converted into polythionate and part of it remains unchanged. I may for instance so limit the supply of sulfurous acid that with three molecular proportions of polythionate, at least two molecular proportions of thiosulfate are maintained. It is however more advantageous to so limit the supply of sulfurous acid that, after its reaction is completed, only one molecular proportion of polythionate is present with every two molecular proportions of thiosulfate. Even a further surplus of thiosulfate is not injurious. The washing efficiency of the liquor is satisfactory as long as there is any polythionate in the liquor. The polythionate in the liquor may amount to only 20 per cent. or 10 per cent. and even less of the total amount of the thionates. Despite this, sulfate may be formed during the second stage of the washing operation, especially if the temperature of the liquor be comparatively high. But even this may be avoided by not allowing sufficient time for the whole of the sulfurous acid absorbed by the liquor to be converted into polythionate in accordance with the above equation of reaction (4). For this purpose the washing liquor is passed very rapidly through the regeneration apparatus in which it is treated with sulfurous acid. I have found that as soon as a certain amount of thiosulfate has been converted into polythionate, the further formation of polythionate from thiosulfate is less rapid. In this case free sulfurous acid will be present in the liquor besides thiosulfate. The passing of the liquor through the regenerating apparatus is therefore most advantageously performed at such a speed that the sulfurous acid is not entirely absorbed in forming polythionate. Care must always be taken that never is sufficient sulfurous acid supplied to convert all the thiosulfate present into polythionate. The regenerated liquor is again used for treating the gases containing the reducing agents. The liquor may be used for this operation in acid condition, that is to say, before the sulfurous acid present is absorbed in forming polythionate. But the liquor may also be used after the absorption of the sulfurous acid in forming polythionate is completed. The free sulfurous acid present after the liquor has passed from the regenerating apparatus may also be fixed, by mixing it with fresh thiosulfate liquor coming from the gas washers which acts as a neutralizing agent. The fresh liquor coming from the washing process has, in consequence of reactions (2) and (3), a high proportion of thiosulfate. If the regenerated liquor contains so much polythionate that the action of free sulfurous acid on the excess of thiosulfate is retarded, the aforesaid addition of fresh washing liquor will increase the proportion of thiosulfate and consequently accelerate the absorption of the sulfurous acid in forming polythionate. Another circumstance may also prevent as much as possible the formation of sulfate during the washing operation. For the process in accordance with the aforesaid specification of my U. S. Letters Patent No. 1,011,043, the presence of free sulfur is necessary. It was presumed that it would be immaterial whether the sulfur be formed in the process, for instance from polythionates, or from other substances yielding sulfur, such for instance as sulfureted hydrogen (in accordance with reaction 3), but this has been proved to be incorrect. In order to as must as possible prevent the production of sulfate during the washing process, and indeed both during the absorption of the reducing agents and the regeneration, it has been found advisable to have always free sulfur present in the thionate liquor. In addition to the substances yielding sulfur, there should always be present free sulfur already precipitated. As long as the liquor is used for the washing process, the sulfur (which forms in the washing process) should therefore not be completely separated from it. The repeated use of the washing liquor may increase the amount of free sulfur in it to such an extent that it becomes too dense, or is caused to foam. In this case a part of the sulfur may be filtered off, or decanted, but care should always be taken that free sulfur still remains in the liquor. Whether, or not, this amount be sufficient will be ascertained from the efficiency of the liquor on sulfureted hydrogen. During the washing process free sulfur should therefore be constantly present in the liquor along with polythionates, and even in the presence of ammonium sulfid, or sulfureted hydrogen, this will assist absorption and avoid as much as possible the formation of sulfate. The prevention of the decomposition of the polythionates into sulfate during the washing process is particularly important when the gases to be treated with the polythionate liquor only contain sulfureted hydrogen. As only the thionates present in the liquor are essential to the washing efficiency, and therefore formation of sulfate reduces the washing capability, this formation should be avoided as much as possible. In this case a part of the sulfur should be removed from the liquor from time to time so that it does not become too thick. If, on the other hand, not only sulfureted hydrogen but also ammonia are to be absorbed by the polythionate liquor, it is necessary, as soon as the concentration of the liquor increases to remove from time to time a part of it. In this concentrated liquor the thionates are then converted into sulfate. In this operation it is (contrary to requirements of the washing operation) advantageous to accelerate the formation of sulfate as much as possible.

I have found that, under certain conditions, the speed of the formation of polythionate from thiosulfate by means of sulfurous acid becomes equal to the speed of decomposition of the polythionate, so that simultaneously with the formation of polythionate, a part of the polythionate is decomposed in forming sulfate. The sulfurous acid then liberated by the formation of sulfate from polythionate is almost entirely absorbed by the thiosulfate present, polythionate being thereby formed. The conditions for this state are given when two molecular proportions of thiosulfate are present with each molecular proportion of polythionate:

(5). $(NH_4)_2S_4O_6 + 2(NH_4)_2S_2O_3 =$
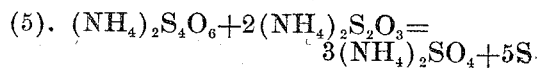
$3(NH_4)_2SO_4 + 5S$

It is therefore advisable in the process of the formation of sulfate not to exceed too greatly the proportion of one molecular proportion of polythyionate to two molecular proportions of thiosulfate, this being done by interrupting the supply of sulfurous acid as soon as this proportion is obtained. By treating liquor containing one molecular proportion of polythionate for every two molecular proportions of thiosulfate, the transformation into sulfate is completed without a further supply of sulfurous acid and without sulfurous acid being separated. The ammonium sulfate obtained by such an operation will be neutral, contrary to the result of the process described in the specification of my aforesaid U. S. Letters Patent No. 1,011,043.

Each of the means above mentioned may advantageously be used in the process of absorbing the reducing agents by means of polythionate liquors, or in the formation of sulfate. I will describe two examples in which I apply all the aforementioned means for the purpose to obtain a most favorable action of the polythionate liquor on gases containing ammonia, or sulfureted hydrogen, or both. In the first example it will be presumed that the gases are treated hot (i. e. before they have been considerably cooled below their dew point for water vapor) for the purpose of absorbing ammonia by polythionate solutions. In the second example it will be presumed that the gases are first cooled and afterward treated with polythionate solutions for the purpose of absorbing both ammonia and sulfureted hydrogen.

Example 1: The extraction of ammonia from hot gases offers the advantage that it is completely absorbed before any considerable amount of water has been condensed. If we presume that the dew point, as regards water vapor, of the coal gas to be treated, is about 75° centigrade 450 grams of water will be separated from each cubic meter of gas in cooling it from 75° down to 30° centigrade. As coal gas contains, on the average, about 8 grams of ammonia per cubic meter, and if all this ammonia were absorbed by the water condensed in cooling the gas to 30° centigrade, there would be obtained an ammoniacal solution of only 1.8 per cent. of ammonia corresponding to a 7.2 per cent. solution of ammonium sulfate. The evaporation of such a dilute solution of ammonium sulfate requires a considerable quantity of steam and is therefore not economical. The ammonia is therefore generally distilled from such ammoniacal water, lime being added to decompose the fixed ammonium salts present. On account of the considerable consumption of steam and lime, this process is not economical, especially when the gases contain much water. It is therefore more advantageous to effect the absorption of the ammonia from the gases at such a temperature that only so much water is condensed from the gases as is necessary for the solution of the ammonium sulfate to be formed. In order to obtain a 32 per cent. solution of ammonium sulfate from gas containing 8 grams of ammonia per cubic meter, only from 100 to 120 grams of water must be condensed per cubic meter of gas. This corresponds to a cooling of from 75° down to only about 72° centigrade. The water of condensation obtained from the hot gases absorbs the fixed ammonium salts consisting mainly of chlorid and partly of sulfite. In the recently proposed process to extract ammonia from hot gases by means of sulfuric acid, these fixed salts prove very troublesome. If they be passed through a bath of sulfuric acid, hydrochloric acid and sulfurous acid are liberated, which pass first into the gas and, in the subsequent cooling, into the water condensed from the gas, and they have, in either case, an injurious action upon the apparatus. Moreover free acids exercise an undesirable influence, which cannot be controlled, on the tar products separated. In the process in accordance with this invention, the ammonium chlorid contained in the water of condensation will mix, without being decomposed, with the polythionate solution, and the ammonium sulfite present in the gas will be converted into thiosulfate which is not dissociated. In consequence thereof the hot gases, after being treated with the solution of polythionate, will not contain free acids. This, and the fact that the gases are free from ammonia, permits of their being cooled directly by cold water, which cooling process is very efficient and allows the use of simpler apparatus than is required if the cooling be effected in what are known as surface coolers. A counter-current apparatus may be utilized. As the cooling water, coming into direct contact with the gas, does not absorb any free acids, this water can, without any further treatment, after having been cooled, (in a cooling tower for example) be used again for cooling the gas. If, on the other hand, the water from the hot gas will absorb acids, as is the case with the so-called direct sulfuric acid process, the acids taken up by the water must be neutralized and should be separated from the water in the form of insoluble salts before the water can be used again for cooling the gas. Apart from the fact that there exists no practical means for separating hydrochloric acid in insoluble form, the neutralization of the water by means of lime would be just as uneconomical as the distillation of ammonia by means of lime from the solutions of fixed ammonium salts. The neutralized water would gradually become highly concentrated with the dissolved calcium salts which would cause incrustations and other troubles. The present process therefore renders it possible to effect the direct cooling of the gases, which cannot be practically effected with the other known processes. If this direct cooling be effected in a counter-current apparatus, it has the further advantage that the consumption of cooling water can be kept as low as possible and that the water leaves the counter-current apparatus at as high a temperature as possible. Of course the quantity of cooling water is increased by the water of condensation separated from the gas in the cooling operation. As however in the present case the cooling water mixed with the water of condensation does not contain solid constituents, the water of condensation may be evaporated by treating the hot cooling water with cool air in a counter-current apparatus, after the water has been separated from any oil which may have been condensed with the water vapors from the gases. The process offers therefore the further advantage that no, or but very little, effluent, or waste, water is obtained by cooling the gas. If the heat absorbed by the cooling water be insufficient for the complete evaporation of the water of condensation, heat of any origin may be supplied in any suitable manner to the water, before, or while it passes through the re-cooling apparatus. Waste heat from furnaces, exhaust steam from engines, or the like, or fresh steam, may be applied for this purpose. One part of the water of condensation may also be used to dilute the thionate liquor.

To extract the ammonia from the hot gases, I proceed in the following manner: After the crude gas is deprived of tar, it is treated in a gas washer at a temperature near to, or but little below, its dew point, with a solution of ammonium polythionate, which, in addition to polythionate, contains thiosulfate in solution and finely divided sulfur in suspension. It is advisable to so regulate the speed of the gas and liquor passing the washer that the liquor leaving it still contains a small amount of polythionate. The absorption of ammonia is then complete and the gas leaves the gas washer practically free from ammonia. But the gas will still contain a large amount of sulfureted hydrogen, because, as already stated, at high temperature, the speed of the reaction of the ammonia increases while that of the sulfureted hydrogen is retarded. The gas may then be treated with polythionate solution as long and as often, (at the same, or a little lower temperature) as is necessary to obtain a satisfactory extraction of sulfureted hydrogen. But as, at the high temperature, the speed of the reaction of sulfureted hydrogen on polythionate is low, it is preferable to cool the gas after the ammonia has been absorbed. This cooling may be effected in surface coolers, but it is preferable to effect it as hereinbefore explained in a counter-current cooler in which the cooling water acts directly on the gas. The counter-current apparatus consists preferably of two, or more, superposed chambers in which the water is brought into as intimate contact as possible with the gas to be cooled. The water enters at the top while the gas enters at the bottom. It is preferable to cool to from about 20° to 40° centigrade and the cooled gas is then again treated with the aforesaid polythionate solution. With a suitably constructed washing apparatus, and by applying a sufficiently long treatment with the polythionate solution, it is possible to extract the sulfureted hydrogen completely, or nearly completely, from the gas. If it be necessary to completely remove the sulfureted hydrogen, the gas may for safety be also subjected to purification by means of iron oxids.

Example 2: In this example it is presumed that the crude gas is cooled to about from 20° to 40° centigrade and freed from tar in a tar separator. In cooling from 75° to 30° centigrade, for instance, 450 grams of water are separated from each cubic meter of gas, which water contains all the fixed ammonia compounds present in the gas, and about 40 per cent. of the free ammonia. A part of this ammoniacal water, and that part which contains the fixed salts is preferably added to, or used to dilute, the thionate solution. Another, and larger, part of this ammoniacal water is treated in a still with the addition of lime, and the vapors of ammonia, sulfureted hydrogen, carbon dioxid and steam which distil off, are led into the thionate solution, or returned into the gas and any liquor which may have condensed from the vapors of the still may also be introduced into the thionate solution. The addition of the vapors to the gas may be made at any suitable point, but should be effected before the gas enters the last polythionate washing apparatus. It is advisable, but not necessary, to cool the vapors of the still entirely, or partially, before they enter the polythionate solution, or the gas. The treatment of the gas with the polythionate solution is effected in one, or more than one washing apparatus. Ammonia and sulfureted hydrogen are absorbed by the polythionate solution.

The washing liquor coming from the washers, in either the first, or the second, example, which liquor should still contain some polythionate (however small the amount may be) is, without previously separating the sulfur precipitated in the washing apparatus, treated with sulfurous acid in a counter-current apparatus. The supply of sulfurous acid, and of the liquor to be regenerated, to the regeneration apparatus is regulated in such a way that the liquor does not absorb more sulfurous acid than is necessary to convert part only of the thiosulfate into polythionate so that excess of thiosulfate is present even if the acid be fully absorbed in the production of polythionate. It is advisable to supply no more sulfurous acid than is necessary to convert about 60 per cent., or less, of the molecular equivalent, of the thionate present into polythionate. In the case of treating hot gas for the extraction of ammonia, and cold gas for extracting sulfureted hydrogen, the solutions from the washing apparatus may also be treated with sulfurous acid in separate regenerators. This is however not essential as the temperature of the liquor has no important influence on the temperature of the gas. If the amount of sulfureted hydrogen be so high that the liquor gradually accumulates sulfur, such sulfur is separated from time to time from part of the liquor. The liquor from the sulfur filter is mixed with liquor containing sulfur, before it is run again to the regenerating apparatus, or to the gas washing apparatus. In order to avoid loss of sulfurous acid in the regenerating operation and to keep the supply of sulfurous acid regular, the regeneration apparatus may be so arranged that the liquor therein is kept constantly at the same level. The liquor coming from the gas washing operation enters this apparatus at the top while the sulfurous acid enters it at the bottom. The liquor thus treated with acid may leave at the bottom through a siphon pipe, so that the required level of the liquor is constantly maintained in the apparatus.

In order to exactly regulate the formation of polythionate and to retard the formation of sulfate without loss of sulfurous acid, it is advisable to carry out the treatment of the thionate liquor with sulfurous acid on the counter-current principle. The thionate liquor to be regenerated is treated with sulfur dioxid in an apparatus comprising two, or more, chambers which may be arranged side by side, but are preferably superposed. If this treatment were effected in one chamber only, the whole of the liquor would ultimately reach such a state that the reaction of sulfurous acid would become too slow, and the sulfurous acid further introduced would pass the liquor unabsorbed. By passing the liquor through two, or more, chambers the liquor in the first chamber in which the sulfurous acid enters will constantly be acid. In this chamber the principal amount of polythionate is formed. The succeeding chamber, or chambers, will always contain such an excess of thiosulfate that the sulfurous acid which has not been absorbed in the first chamber is absorbed in the succeeding chamber, or chambers. In order to effect as much as possible the absorption of the sulfurous acid, thorough mixing is effected by means of any suitable stirring, or agitating, arrangement. The application of the counter-current principle is known, but in the present case it leads to a new effect that could not be foreseen. After the liquor has accumulated a sufficient amount of ammonium salts, it is wholly, or partly, treated for the formation of sulfate. In the latter case the remaining liquor is then diluted by the addition of fresh water, or ammoniacal water, and brought up to the required volume and used again in the washing operation as hereinbefore described. Sulfurous acid is passed through that part of the liquor, which is to be treated for the formation of sulfate and the liquor is heated, simultaneously, or subsequently, in a boiling apparatus. It is advisable to supply only so much sulfurous acid to the liquor that a good third, or half, of the molecular proportion of the thionates present is converted into polythionate. Although the liquor may be treated with sulfurous acid above this limit it is more advantageous, for the purpose of accelerating the formation of sulfate and obtaining a neutral sulfate, to limit the supply of sulfurous acid as aforesaid. The formation of sulfate may also be effected in two separate apparatus, first treating the liquor with sulfurous acid in an apparatus similar to the regeneration apparatus with a constant level of liquor and a stirring device, and comprising two, or more, chambers. The liquor passing this apparatus may be slightly heated, as the speed of the formation of polythionate from thiosulfate is higher on heating than in the cold. From this apparatus the liquor passes into the boiling apparatus in which the thionates are decomposed into sulfates and sulfur, sulfurous acid being eventually evolved. The precipitated sulfur is separated from the sulfate solution and this is treated to yield crystallized sulfate. In case the gases should, in addition to ammonia, contain hydrogen cyanid it is advisable to remove the latter previous to the treatment with polythionate solution.

What I claim is:—

1. A process of recovering sulfur and sulfates from a polythionate solution of the character described which comprises the step of alternately treating said solution with a suitable reducing agent and then with sulfurous acid, the sulfurous acid employed in such alternating treatment being insufficient for the complete oxidation of the thiosulfate present into polythionate whereby an excess of thiosulfate is maintained during the absorption of the reducing agent and the formation of thiosulfates, as well as during the reconversion of the thiosulfates into polythionates, substantially as and for the purpose described.

2. A process of recovering sulfur and sulfates from a polythionate solution of the character described which comprises the step of alternately treating said solution with a suitable reducing agent and then with sulfurous acid, the sulfurous acid employed in such alternating treatment being so limited that after the reaction is completed, not more than one molecular proportion of polythionate is present to two molecular proportions of thiosulfate.

3. A process of recovering sulfur and sulfates from a polythionate solution of the character described which comprises the step of alternately treating said solution with a suitable reducing agent and then with sulfurous acid, the sulfurous acid employed in such alternating treatment being introduced in such manner that part of it remains as free acid in the liquor along with the thiosulfate and polythionate, and being introduced in such limited quantity that the thiosulfate is not completely converted into polythionate.

4. A process of recovering sulfur and sulfates from a polythionate solution of the character described, which comprises the step of alternately treating said solution with a suitable reducing agent and then with sulfurous acid, the acid solution of thionate being mixed with the thiosulfate liquor before further treatment with reducing agents, while the acid used in said alternating treatment being present in such limited quantity that the thiosulfate is not completely converted into polythionate.

5. A process of recovering sulfur and sulfates from a polythionate solution of the character described, which comprises the step of subjecting a polythionate solution containing thiosulfate to the action of a suitable reducing agent.

6. A process of recovering sulfur and sulfates from a polythionate solution of the character described, which comprises the step of treating gases containing ammonia and sulfureted hydrogen at a temperature above 40° C. with thionate solution and, after absorption of ammonia has taken place, treating the gases at a temperature below 40° C. with thionate solution to absorb sulfureted hydrogen.

7. A process of recovering sulfur and sulfates from a polythionate solution of the character described, which comprises the step of treating gases containing ammonia and sulfureted hydrogen, at a high temperature, approximately the dew point, with thionate solution, and, after absorption of ammonia has taken place, treating the gases at a temperature below the dew point with thionate solution to absorb sulfureted hydrogen.

8. A process of recovering sulfur and sulfates from a polythionate solution of the character described which comprises the steps of enriching with ammonia vapor gases containing ammonia and sulfureted hydrogen and reacting said gases at a temperature above 40° C. with thionate solution to absorb the ammonia in the gases, for the purpose described.

9. A process of recovering sulfur and sulfates from a polythionate solution of the character described which comprises the step of alternately treating said solution with a suitable reducing agent and then with sulfurous acid, in the presence of free sulfur, the sulfurous acid employed in such alternating treatment being insufficient for the complete oxidation of the thiosulfate present into polythionate whereby an excess of thiosulphate is maintained during the absorption of the reducing agent and the formation of thiosulfates as well as during the reconversion of the thiosulfates into polythionates, substantially as and for the purpose described.

10. A process of recovering sulfur and sulfates from a polythionate solution of the character described, which comprises the step of treating the solution with a suitable reducing agent and then at substantially atmospheric temperatures with sulfurous acid until between one and two thirds of the thionates are converted into polythionates, and then treating the solution, substantially as described.

In testimony whereof I have signed my name to this specification in the presence of two subscribing witnesses.

WALTHER FELD.

Witnesses:
WILLIAM ABBE,
L. H. GROTE.